United States Patent [19]

Nausedas

[11] Patent Number: 4,914,784
[45] Date of Patent: Apr. 10, 1990

[54] SHIRRED CASING ARTICLE LOADER/UNLOADER

[75] Inventor: Joseph A. Nausedas, Oak Forest, Ill.

[73] Assignee: Viskase Corporation, Chicago, Ill.

[21] Appl. No.: 302,281

[22] Filed: Jan. 27, 1989

[51] Int. Cl.⁴ ............................................. A22C 11/02
[52] U.S. Cl. ............................................ 17/42; 17/33; 17/49; 53/581
[58] Field of Search .................... 17/42, 33, 34, 35, 49, 17/1 F; 53/581, 141, 567

[56] References Cited

U.S. PATENT DOCUMENTS

| | | | |
|---|---|---|---|
| 3,158,896 | 12/1964 | Marbach | 17/42 |
| 3,209,398 | 10/1965 | Ziolko | 17/42 |
| 3,952,370 | 4/1976 | Greider | 17/41 |
| 4,306,334 | 12/1981 | Niedecker | 17/49 |
| 4,336,632 | 6/1982 | Wilson et al. | 17/42 |
| 4,358,873 | 11/1982 | Kollross | 17/33 |
| 4,489,460 | 12/1984 | Nausedas | 17/49 |
| 4,547,931 | 10/1985 | Staudenrausch et al. | 17/1 F |
| 4,571,922 | 2/1986 | Steffen | 17/42 |
| 4,593,433 | 6/1986 | Nausedas | 17/49 |
| 4,625,362 | 12/1986 | Kollross et al. | 17/33 |
| 4,660,254 | 4/1987 | Kollross | 17/33 |
| 4,847,952 | 7/1989 | Evans | 17/35 |
| 4,847,953 | 7/1989 | Evans et al. | 17/35 |

FOREIGN PATENT DOCUMENTS 2077244 12/1981 United Kingdom .

Primary Examiner—Willis Little
Attorney, Agent, or Firm—Roger Aceto

[57] ABSTRACT

Apparatus and method for loading a shirred casing article into a stuffing horn tilted upwardly at a load position with respect to horizontal. The article is moved along a horizontal rail supported above the stuffing horn. The article spills over an end of a rail and onto a chute. The chute is in alignment with the upwardly tilted horn so that a driven member can engage the article and drive it down the chute onto the horn. The driven member is reversible so a spent casing article on the upwardly tilted horn can be unloaded by driving it up the chute to a positions here it spills over the upper end of the chute and discards.

21 Claims, 3 Drawing Sheets

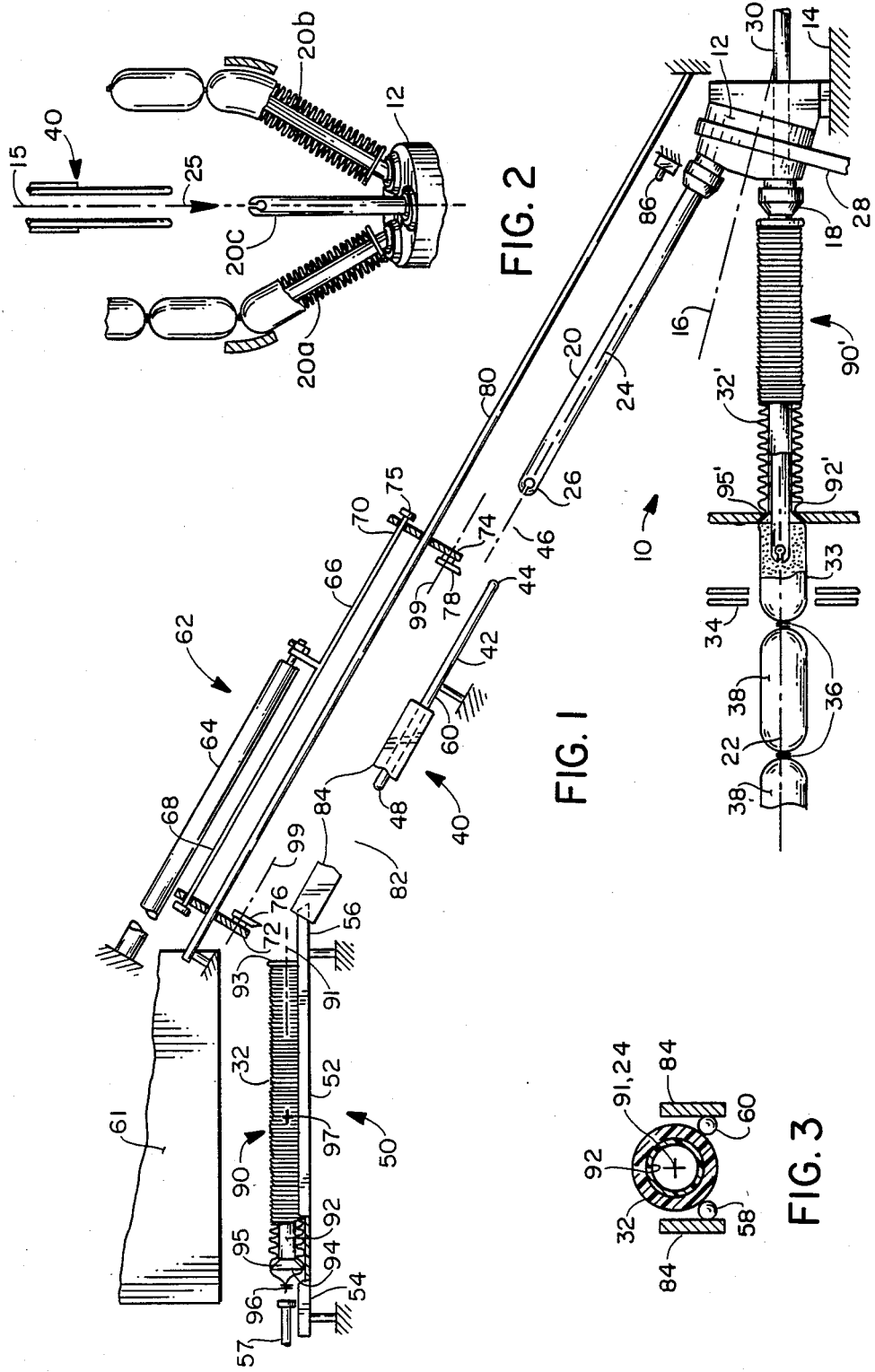

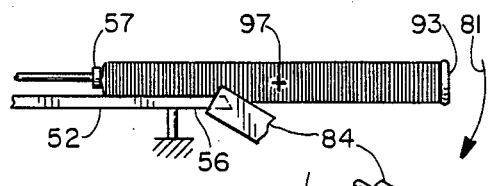
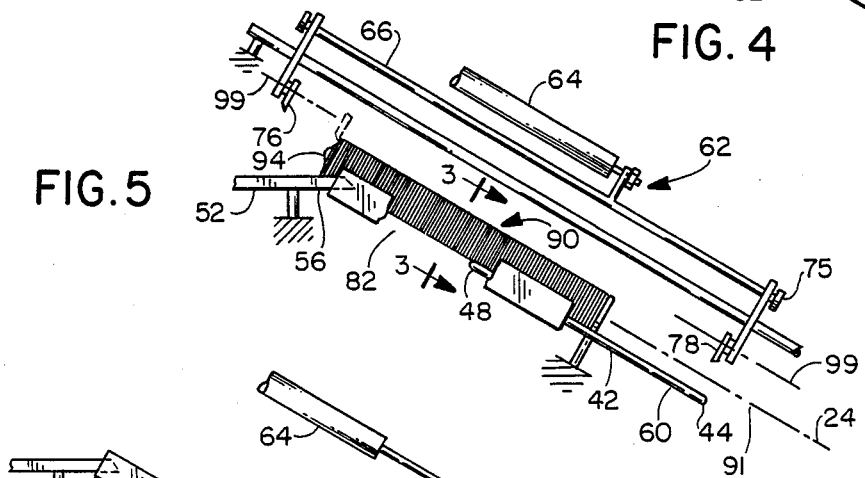
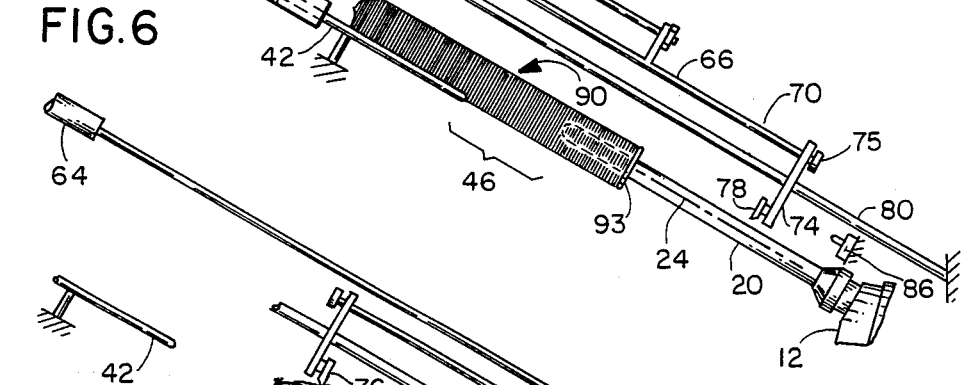
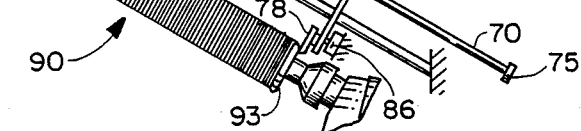
FIG. 4
FIG. 5
FIG. 6
FIG. 7

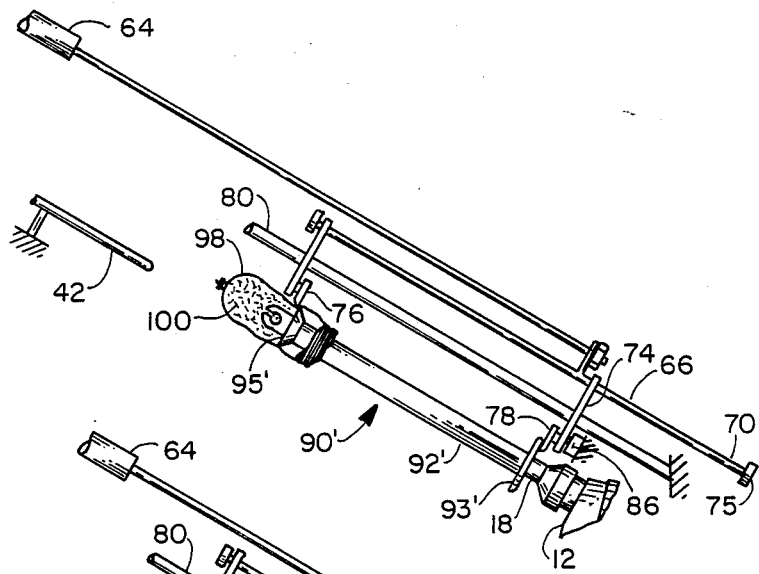
FIG. 8
FIG. 9
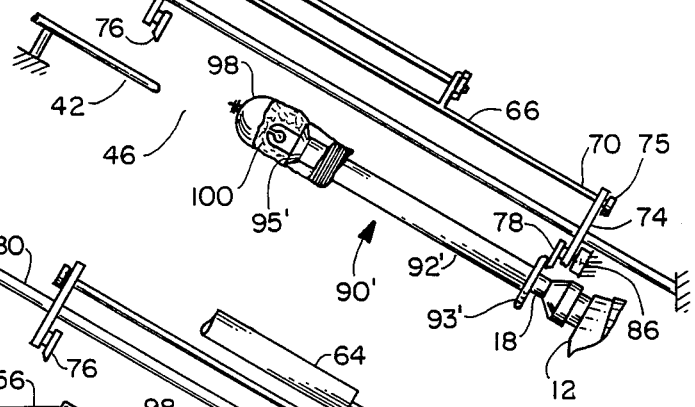
FIG. 10
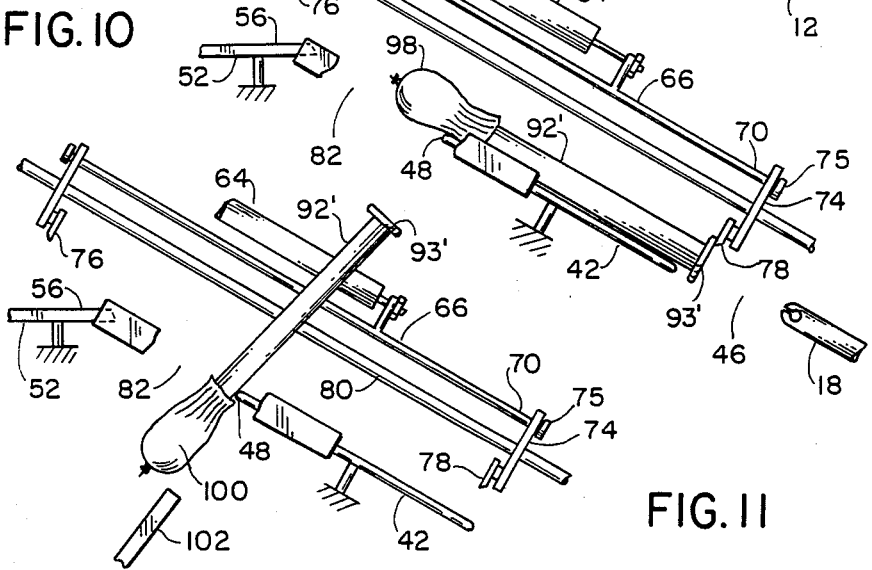
FIG. 11

SHIRRED CASING ARTICLE LOADER/UNLOADER

TECHNICAL FIELD

The present invention relates to a mechanism for loading casing articles onto a stuffing horn of a stuffing machine. More particularly, in a preferred embodiment the present invention relates to a mechanism for loading a cored casing article onto an uptilted stuffing horn and subsequently unloading the spent core from the horn after stuffing the casing supply carried by the core.

BACKGROUND OF THE INVENTION

Stuffing machines having a plurality of stuffing horns are known in the art. Typically, these machines have at least two horns carried by a turret. One horn on the turret is in a stuffing position while casing is loaded onto one or more of the other horns. As the casing supply becomes exhausted during stuffing, the turret is indexed to move one of the other horns and its supply of casing into a stuffing position. Such an arrangement is disclosed in U.S. Pat. Nos. 4,675,945; 4,307,489; 4,438,545; 1,043,241 and 557,032 among others.

It also is known to shirr casing onto a horn at one position and then move the horn into a stuffing position. As an alternative, the casing is shirred onto a carrier located adjacent the stuffing horn and then the casing is removed from the carrier and transferred by mechanical means onto the stuffing horn. This arrangement is disclosed in U.S. Pat. Nos. 4,660,254; 4,625,362 and 4,358,873.

U.S. Pat. Nos. 4,489,460 and 4,593,433 disclose still another arrangement. In these patents, the casing articles comprise a shirred casing disposed on a tubular core wherein the tubular core constitutes a disposable stuffing horn. A loading device moves these articles into a stuffing position for connecting the tubular core directly to an outlet of the stuffing machine. After the casing is stuffed, the loading device moves the tubular core (now empty of casing) away from the stuffing position. Thus, the device disclosed in each of these patents is a loader/unloader in that it loads the cored casing article into a stuffing position and removes the empty or spent core from the stuffing position.

In general, the devices for loading casing into a stuffing position (and unloading spent cores) are arranged, and take up space, at the side of the stuffing machine. This in turn limits access to the stuffing horn from only one side of the machine and interferes with the simultaneous use of side-by-side horns for stuffing.

Accordingly, one object of the present invention is to provide a loading apparatus for supplying casing articles to a multihorn stuffing machine.

Another object is to provide loading apparatus which is located above the plane of the stuffing machine thereby providing free access to either side of a stuffing horn located below the loader.

A further object is to provide loading apparatus which permits the simultaneous use of two side-by-side horns for stuffing.

Yet another object is to provide a loading apparatus for supplying casing articles onto an upwardly tilted stuffing horn.

A still further object is to provide a loading apparatus for moving a cored casing article into a stuffing position, the casing article comprising a shirred casing disposed on a tubular core, and then removing the tubular core from the stuffing position after the casing has been stuffed.

SUMMARY OF THE INVENTION

The present invention is characterized by a loading apparatus for supplying a shirred casing article to an upwardly tilted stuffing horn comprising:

(a) a chute arranged to support a said casing article in longitudinal alignment with said upwardly tilted horn, said chute having upper and lower ends with said lower end and the horn discharge end defining a space therebetween which is shorter than the length of a said casing article to be loaded;

(b) pusher means movable along an inclined path of travel extending generally parallel to said chute; and (c) a first member carried by said pusher and engageable with a said casing article for driving a said casing article down said chute and across said space and onto said upwardly tilted stuffing horn.

DESCRIPTION OF THE DRAWING

FIG. 1 is an elevation view, showing a portion of a stuffing machine and the orientation of the loading apparatus above the plane of the stuffing machine;

FIG. 2 is a plan view of the loading apparatus in schematic fashion and on a smaller scale illustrating the orientation of the loading apparatus along a mid line of the stuffing machine to permit use of side-by-side horns for stuffing;

FIG. 3 is a view on an enlarged scale taken along lines 3—3 of FIG. 5;

FIGS. 4–7 are elevation views of portions of the loading apparatus illustrating a sequence for loading a casing article onto an upwardly tilted stuffing horn; and FIGS. 8–11 are views similar to FIGS. 4–7 only illustrating the unloading of a portion of a casing article from an upwardly tilted stuffing horn.

DETAILED DESCRIPTION

Referring to the drawings, FIG. 1 shows a portion of a stuffing machine generally indicated at 10. The machine includes a turret 12 carried by the frame of the machine, a portion of which is shown at 14. The turret is rotatable about an axis 16 which is inclined at an angle of about 10° with respect to the horizontal and carries at least two stuffing horns 18, 20. At any given time, one horn (horn 18 in FIG. 1) is aligned along generally a horizontal stuffing axis 22 in a stuffing position. At the same time, the other horn (horn 20 in FIG. 1) is oriented so its longitudinal axis is substantially coincident with an inclined axis 24 (hereafter also referred to as "load axis") that defines a load position. In this load position, the horn 20 tilts upwardly so its discharge or forward end 26 points upwardly along load axis 24. Any suitable means as illustrated by a timing belt 28, is operated for rotating the turret in a stepwise fashion about axis 16 to index the horns from one position to the other (i.e., between stuffing axis 22 and load axis 24).

During stuffing, a food product under pressure is delivered through a conduit 30 and a passage (not shown) in the turret to the stuffing horn in the stuffing position (horn 18 as shown). This horn carries a supply of shirred casing 32' (hereafter referred to as a "shirred stick"). During stuffing, casing 33 is drawn forward from the shirred stick and stuffed by the food product discharging from the horn. A conventional clipper, a portion of which is shown at 34, closes about the stuffed casing and applies a suitable closure, such as a metal clip 36, to form individual stuffed products 38.

While casing from the shirred stick 32' on horn 18 is being stuffed, another shirred stick can be loaded onto horn 20 at the load position. When the shirred stick on horn 18 is substantially exhausted, stuffing is interrupted so turret 12 can index to switch the positions of the horns, thereby bringing horn 20 and the shirred stick it carries into the stuffing position.

The loader of the present invention, generally indicated at 40, is arranged for loading a shirred stick onto an upwardly tilted horn oriented along load axis 24. In this respect, the loader is located above the plane of the stuffing machine as defined by frame 14 so shirred sticks can be delivered to the upwardly tilted horn.

By locating the loader 40 above the plane of the stuffing machine, the area beneath the loader and about the stuffing axis 22 is freely accessible. In the case of a stuffing machine having two horns as shown in FIG. 1, this means that the horn along stuffing axis 22 is serviceable from either side of the machine.

Locating the loader above the stuffing machine also facilitates the use of side-by-side horns for stuffing. For example, as shown in the plan view of FIG. 2, turret 12 carries three horns wherein horns 20a and 20b are both in a stuffing position and horn 20c is in a load position. The loader 40 is shown disposed between the two side-by-side horns 20a and 20b for loading articles onto the upwardly tilted horn 20c. Thus, both horn 20c and loader 40 are disposed along a midline 15 of the machine and in substantially the same vertical plane so that casing articles may be moved by the loader in the direction of arrow 25 onto the upwardly tilted horn 20c. A stuffing machine utilizing three horns as illustrated in FIG. 2 is more particularly described in a copending application Ser. No. 297,364. For purpose of the present invention, however, the loader will be described in connection with a stuffing machine having only two stuffing horns movable between load and stuffing positions as shown in FIG. 1.

The loader 40 (FIG. 1) includes a chute 42 positioned so that a shirred stick sliding down the chute will pass onto a horn position along load axis 24 (horn 20 as shown in FIG. 1). In order to pass onto the horn, the shirred stick on the chute must be held substantially concentric with the horn. Accordingly, chute 42 is supported in longitudinal alignment with a horn in the load position but slightly below the load axis 24. This allows a shirred stick on the chute to have its longitudinal axis on center, and longitudinally aligned, with the load axis 24. This arrangement is best illustrated in FIG. 3.

In FIG. 3, chute 42 is shown to comprise a pair of adjacent rods 58,60. These rods are spaced apart a distance sufficient to cradled and support a shirred stick 32 so the longitudinal axis 91 of the shirred stick is axially aligned and generally on center with the load axis 24. If desired, the rods 58,60 can be mounted so the transverse distance between them is adjustable. For example, a scissor linkage (not shown) can be used to adjust the distance between the rods. This will permit adjustment of the chute to accommodate shirred sticks of various diameters while maintaining the longitudinal axis of the shirred stick axially aligned and generally on center with the load axis 24.

As shown in FIG. 1, chute 42 has a lowermost end 44 positioned with a clearance space 46 between it and the adjacent end 26 of the stuffing horn. This clearance allows movement of the stuffing horns 18,20 between their load and stuffing positions without interference with the chute. The length of clearance space 46 is shorter than the length of a shirred stick to be loaded onto the horn so a shirred stick is able to span the clearance space.

The chute has an uppermost end 48 which initially receives the shirred stick to be loaded. While the stick may be manually loaded onto the chute, it is preferred that the stick be delivered automatically onto the chute from a remote location. To accomplish this automatic delivery, loader 40 includes a transporter portion generally indicated at 50. The transporter is disposed above both chute 42 and the plane of the stuffing machine (as defined by frame 14) so that there is clear space below the transporter and access to either side of a stuffing horn oriented along stuffing axis 22.

Transporter 50 includes a guide rail 52 which is generally horizontally oriented. Rail 52 defines a substantially straight path extending between a receiving station 54 remote from the chute and a discharge station 56 adjacent the chute uppermost end 48. Discharge station 56 constitutes the end of the rail 52 and is sometimes referred to hereafter as rail end 56. Thus, a shirred stick positioned on the rail and moved along the rail will eventually spill over the rail end 56 and onto chute 42.

Adjacent the transporter receiving station 54 is a hopper 61. This hopper per se forms no part of the present invention and is merely described herein as a combination storage container and dispenser for shirred sticks. It preferably is large enough to contain a plurality of shirred sticks and operates to deposit them one at a time onto the rail 52 at the receiving station 54.

Movement of a shirred stick from the receiving station and along rail 52 is accomplished by any suitable means such as a pusher, a portion of which is shown at 57. The pusher, when operated, engages against a shirred stick and moves it along the rail until it spills over the end 56.

As an alternative, transporter 50 can be a motor driven endless belt which itself moves the shirred stick along until it spills over the end of the belt and onto chute 42.

The chute uppermost end 48 and the rail end 56 may intersect to provide a substantially continuous support for a shirred stick being moved along the rail and onto the chute. However, a preferred arrangement is to have the chute uppermost end 48 spaced below and laterally offset from the rail end 56 (as shown in FIG. 1) such that the locus of the chute extended will intersect rail end 56. This preferred arrangement will provide a gap 82 between the chute and rail for purposes set out hereinbelow. Gap 82 may be bridged by supports 84 which are attached to the outboard sides of chute 42 and extend up to the rail end 56.

A shirred stick which spills over the rail end 56 and onto the chute, may be prevented by friction from sliding down the chute and onto the stuffing horn. Accordingly, the loader 40 includes a carrier generally indicated at 62 for engaging and moving shirred sticks down the chute and onto a stuffing horn at the load position.

Carrier 62 includes a drive means such as a pneumatic cylinder 64. This cylinder drives an elongated rod 66 back and forth along an inclined path of travel parallel to load axis 24. Thus, rod 66 has a high end 68 and a low end 70. On either end of the rod is a bracket 72,74. Bracket 72 is fixed to the high end 68 of the rod whereas bracket 74 is slideably carried by the low end 70 of the rod. A flange 75 prevents the lower bracket 74 from sliding off the rod.

A finger 76 attached to the upper bracket 72 juts towards the load axis 24. In this position, moving rod 66 downwardly along its path of travel will engage the finger 76 against an end of a shirred stick on the chute.

A receiving plate 78 attached to lower bracket 74 also juts toward the load axis 24 for receiving an end of a shirred stick opposite to the end engaged by finger 76.

To insure that both brackets 72,74 travel in a path parallel to the load axis 24, they are guided during movement by an elongated bar 80. The bar 80 is supported at a fixed position parallel to the load axis 24 and the brackets 72,74 slide along this bar as rod 66 moves up or down along its inclined path of travel.

Loader 40 also includes a stop and limit switch 86 positioned adjacent turret 12. Switch 86 defines a "home" position for shirred sticks on the horn and it cooperates with plate 78 to insure that a shirred stick is received and properly positioned on the horn, as further described hereinbelow.

The operation of loader 40 will be described with reference to a preferred use wherein the stuffing machine utilizes a cored casing article for stuffing. A cored casing article per se forms no part of the present invention and is more particularly described in U.S. Pat. No. 4,649,602 the disclosure of which is incorporated herein by reference.

For purposes of the present invention, it is sufficient to say that a cored casing article 90 as shown on rail 52 in FIG. 1 comprises a shirred stick 32 carried by a disposable plastic tube 92 which slideably fits over a stuffing horn. The aft end of the tube has a shoulder 93 which helps retain the shirred stick on the tube. At the fore end 94 of the casing article, the tube is flared outwardly to provide a sizing means 95 for stretching the casing which deshirs and draws forward over the sizing means during stuffing. The end of the casing drawn over the sizing means 95 is closed by a clip 96 to contain the food product stuffed into the casing.

To describe the operation of the loader, reference is first made to FIG. 1. As shown in FIG. 1 a cored casing article 90' is on horn 18. As mentioned hereinabove, horn 18 is aligned along stuffing axis 22 in a stuffing position. Casing 33, which deshirrs from the shirred stick 32' on the core 92', draws forward over the sizing means 95' and is stuffed and clipped to form individual stuffed sausages 38. At the same time horn 20 is in a load position tilted upwardly along load axis 24 and is ready to receive a casing article.

The first step is to deposit a cored casing article 90 onto rail 52 at receiving station 54. Since the receiving station is remote from the stuffing horns 18,20 and the clipper 34, the casing article can be manually deposited on the rail without the danger of injury to the operator. However, it is preferred that the articles be automatically dispensed onto the rail from a hopper 61.

The casing article 90 is positioned on rail 52 so its longitudinal axis 91 extends parallel to the longitudinal direction of the rail. Pusher 57 then operates and pushes against the fore end 94 of the casing article to move it along the rail to the rail end 56. The casing article is moved in this fashion along the rail in a straight line from the receiving station 54, the movement being in the direction of the longitudinal axis 91 of the article.

Movement of the casing article along rail 52 continues until the center of gravity 97 (which is about at the midpoint of the article) moves beyond the rail end 56 (FIG. 4). At this point, the article begins to tip about the rail end 56 due to gravity and it spills in the direction of arrow 81 onto chute 42. The length of the casing article as measured between its center of gravity 97 and its end which first reaches the discharge station (namely tube shoulder 93) must be longer than the length of gap 82 otherwise, the casing article will not spill onto the chute upper end to bridge the gap.

As the casing article spills from the rail, it bridges the gap 82 between the chute uppermost end 48 and the rail end 56 (FIG. 5). At this position the casing article 90 is disposed between the finger 76 and plate 78 of the carrier 62. It is likely that the casing article will stop at this point and that friction will prevent it from sliding farther down the chute. Of course, this depends upon the inclination of the chute. If the chute is disposed at a relatively steep angle, the casing article might slide by gravity farther down the chute and perhaps onto the upwardly tilted horn 20.

In any event, pneumatic cylinder 64 now operates to move rod 66 downwardly along its inclined path of travel. This carries finger 76 into engagement against the fore end 94 of the casing article (as shown on dotted line in FIG. 5) for moving the article down chute 42.

As mentioned hereinabove, the casing article 90, when positioned on chute 42 and cradled by rods 58,60 (FIGS. 3 and 5), has its longitudinal axis 91 axially aligned and generally on center with load axis 24. Accordingly, continued operation of cylinder 64 now ushers casing article 90 down chute 42, across clearance space 46 and onto the upwardly tilted horn 20 at the load position (FIG. 6). Since the horn at the load position has its longitudinal axis substantially coincident with load axis 24, the casing article 90 slips concentrically over the stuffing horn.

As rod 66 continues to move down its path of travel, bracket 74 and plate 78 (positioned at the low end 70 of rod 66) slide along guide bar 80. Eventually the bracket 74 will bottom against limit switch 86. The rod 66, however, continues its downward movement because the bracket 74 is only slideably carried by the rod. This continued movement of the rod allows the finger 76 to push the casing article farther onto the horn until the aft end of casing article (tube shoulder 93) bottoms against plate 78 (FIG. 7). When this occurs the bracket 74 will be pressed against the limit switch 86 with sufficient force to trigger the switch. This indicates that a casing article has been received and that it is properly positioned on the horn so further movement of rod 66 stops.

Stuffing continues at horn 18 as shown in FIG. 1 until the supply of casing on the horn is substantially completely exhausted. When this occurs, stuffing stops, clipper 34 applies a pair of clips 36 and the casing is severed between the clips to separate the last formed sausage from casing remaining on the tubular core.

Thereafter, turret 12 is indexed by rotation about axis 16 to switch the Positions of horns 18,20. That is, horn 18 moves from its stuffing position along stuffing axis 22 to the load position along the load axis 24; and horn 20 moves from its load position along load axis 24 to the stuffing position. Preferably, finger 76 and plate 78 are journaled to their respective brackets 72,74 so they can pivot about an axis 99. This allows the horns 18,20 to move the finger and plate out of the way as the horns rotate into or out of the load position. A suitable spring bias (not shown) may be incorporated into the journals of the finger and plate to insure the return of these members to the position shown in FIG. 1 should they be moved by the horns.

As shown in FIG. 8, all that remains of the cored casing article 90' after stuffing is the tubular core 92' and a remnant 98 of casing which extends over sizing means 95' and encloses a mass of food product 100 left in the casing when stuffing is stopped. Rotating horn 18 to the load position, moves the tubular core 92' into the position between finger 76 and plate 78 which was vacated by the casing article on horn 20. It should be appreciated that before a new casing article can be loaded onto horn 18, the core 92', casing remnant 98 and the food mass 100 it contains, must be removed from the horn.

Accordingly, after the horn 18 is moved to the load position, the action of cylinder 64 is reversed. This retracts and the elongated rod 66 from its position as shown in FIG. 8 and moves it upwardly along its inclined path of travel back towards the position as shown in FIG. 1. Initially, only rod 66 moves because the bracket 74 is slideable with respect to the rod 66. No movement of bracket 74 occurs until flange 75 on the end of the rod is carried against the bracket. After the flange 75 engages bracket 74, continued movement of rod 66 will cause plate 78 to press against the shoulder 93 at the aft end of the tubular core (FIG. 9) for driving the core off the upwardly tilted horn 18. The tubular core 92' will first span the clearance space 46 and then will pass onto the chute 42 (FIG. 10).

As described hereinabove, there is a gap 82 between the end 56 of rail 52 and the upper end 48 of the chute. Accordingly, as tubular core 92' moves up chute 42, the heavy mass of food product 100 at its fore end will drop into this gap and cause the core 92' to tip or spill over the chute uppermost end 48. The result is that the entire core and its contents falls through the gap and are discarded (FIG. 11). As the core falls into gap 82, it may be received onto a second chute 102 which carries the core away from the loader for disposal.

Cylinder 64 continues to move rod 66 until it reaches the position as shown in FIG. 11, and then stops. At this position (also shown in FIG. 1), finger 76 and plate 78 are spaced apart for receiving another casing article which spills from the rail 52 of transporter 50 onto chute 42.

Having described the invention in detail it should be appreciated that it accomplishes its intended objects in providing a loader for automatically supplying casing articles to a stuffing horn tilted upwardly to receive the article. The loader, being disposed above the plane of the stuffing machine, provides free access to either side of a stuffing horn below the loader. While the invention has been described in combination with a stuffing machine having two horns, it is most useful when used to load casing articles onto a stuffing machine having more than two horns. A preferred use is to load casing articles onto a horn of a stuffing machine disclosed in copending application Ser. No. 297,364, wherein the horn in the load position occupies a position along the center or mid line of the stuffing machine between two side-by-side horns. In this respect, the loader of the present invention, being disposed above the plane of the machine, allows the location of the two side-by-side horns in the space below and to either side of the loader.

A preferred embodiment of the invention has been described herein without reference to a control system for operating the components of the invention (for example, controls for reversing the operation of cylinder 64 when the limit switch 86 is operated). This is because the provision of an appropriate control system is well within the skill of one of ordinary skill in the art of providing control systems for stuffing machine.

It should be appreciated that changes may be made in the construction and operation of the loader/unloader of the present invention without departing from the spirit and scope of the invention as claimed. For example, a dog and chain drive or other reversible drive means can be substituted for pusher 57 and cylinder 64 to move a casing article 90 along rail 52 and down chute 42 onto an upwardly tilted stuffing horn.

The loader of the present invention is most useful for loading cored casing articles and then unloading the empty or spent core a described hereinabove. However, the loader can be adapted to load shirred sticks (uncored) onto an upwardly tilted stuffing horn. It should be appreciated that when adapted to load shirred sticks (uncored) modifications are needed to provide for the removal of any casing remnant and the food product it contains which may be left on the horn. For example, for this purpose, each horn can be provided with a wiper that operates after stuffing and travels along the horn to remove any casing remnant and food product from the horn. As an alternative, plate 78 may be adapted to perform such a wiping function as it is moved by the pneumatic cylinder 64 from the FIG. 8 position to the FIG. 11 position.

Having thus described the invention in detail what is claimed as new is:

1. Apparatus for loading a shirred casing article onto an upwardly tilted stuffing horn comprising:
   (a) a chute arranged to support a said casing article in longitudinal alignment with said upwardly tilted horn, said chute having upper and lower ends with said lower end and the horn discharge end defining a space therebetween which is shorter than the length of a said casing article to be loaded;
   (b) pusher means movable along an inclined path of travel extending generally parallel to the longitudinal axis of said chute; and
   (c) a first member carried by said pusher and engageable with a said casing article for ushering a said casing article down said chute and across said space and onto said upwardly tilted stuffing horn.

2. Apparatus as in claim 1 including transport means for delivering a said casing article from a receiving station remote from said chute to a discharge station adjacent said chute upper end.

3. Apparatus as in claim 2 wherein said transport means is disposed above said chute and defines a substantially straight horizontal path which extends from said receiving station remote from said chute upper end to said discharge station adjacent said chute upper end, and said transport means including a drive for moving a said casing article in the direction of its longitudinal axis and along said horizontal path from said receiving station to said discharge station and, at said discharge station, said transport means spilling a said casing article onto said chute.

4. Apparatus as in claim 3 wherein said transport means, said chute and said upwardly tilted stuffing horn are oriented in substantially the same vertical plane such that a said casing article to be loaded travels in said plane from said receiving station to said horn.

5. Apparatus as in claim 4 wherein said vertical plane containing said transporter means, chute and upwardly tilted stuffing horn are located along a mid line of a stuffing machine and between two generally horizontally oriented stuffing horns.

6. Apparatus as in claim 2 wherein said transport means comprises:
   (a) a substantially straight rail disposed above said chute having a first end remote from said chute upper end and a second end adjacent said chute upper end, said rail, chute and upwardly tilted stuffing horn being oriented in generally the same vertical plane; and
   (b) drive means for moving a said casing article along said rail from said first end to said second end and then over said second end onto said chute.

7. Apparatus as in claim 6 wherein said rail second end terminates above and laterally spaced from said chute upper end such that the locus of said chute extended will intersect said rail second end and the linear distance between said rail second end and chute upper end defines a gap which is shorter than the length of a said casing article to be loaded as measured between its center of gravity and its end which is first to reach said rail second end.

8. Apparatus as in claim 1 wherein said pusher means comprises:
   (a) a rod having its longitudinal axis oriented in the direction of said inclined path of travel;
   (b) reversible drive means for moving said rod in upward and downward directions along said path of travel; and
   (c) said first member being fixed to the elevated end of said rod for engagement against an end of a said casing article which is uppermost when on said chute.

9. Apparatus as in claim 8 including a second member carried by a lower end of said rod and said first and second members defining a space therebetween for receiving a said casing article wherein said second member is engageable against an end of a said casing article which is lowermost when loading onto said upwardly tilted stuffing horn.

10. Apparatus as in claim 9 including a fixed bar oriented substantially parallel to said inclined path of travel providing means for guiding said first and second members during the movement of said members along said inclined path of travel.

11. Apparatus as in claim 9 wherein said second member is slideably carried by said rod and said rod lower end having a flange which prevents the removal of said second member from said rod.

12. Apparatus as in claim 11 including a stop at a fixed position adjacent the lower end of said upwardly tilted stuffing horn and in the path of travel of said second member for engaging against and stopping the movement of said second member in a downward direction while permitting the continued downward movement of said rod relative to said second member.

13. Apparatus as in claim 9 wherein a said casing article includes a shirred casing carried by a tubular core, said core being slidable over said upwardly tilted stuffing horn and said second member being engageable against an end of a said tubular core which is lowermost on said upwardly tilted stuffing horn and said drive means being reversible to engage said second member against said tubular core lowermost end and to drive said core off said horn and up said chute for discarding over the upper end of said chute.

14. A method of loading a shirred casing article onto a stuffing horn comprising the steps of:
   (a) positioning a stuffing horn along a longitudinal load axis which is tilted upwardly with respect to horizontal;
   (b) transporting a shirred casing article in the direction of its longitudinal axis along a substantially straight path from a receiving station to a discharge station located above and laterally spaced from the uppermost end of said horn;
   (c) tilting the shirred casing article about the discharge station and downwardly to reorient and bring the longitudinal axis of the shirred casing article into longitudinal alignment with said load axis; and
   (d) moving said shirred casing article downwardly in direction of its reoriented longitudinal axis and onto the stuffing horn thereby concentrically positioning the shirred casing article on the stuffing horn.

15. A method as in claim 14 wherein said transporting step (b) comprises moving said shirred casing article along a substantially horizontal path of travel from said receiving station to said discharge station.

16. A method as in claim 15 including moving said shirred casing article along said substantially horizontal path of travel until its center of gravity is beyond said discharge station and then tilting said shirred casing article by gravity at step (c) to reorient it such that its longitudinal axis is longitudinally aligned and substantially on center with said load axis.

17. A method as in claim 14 including:
   (a) receiving a shirred casing article from said tilting step (c) onto a chute which supports said reoriented shirred casing article in axial alignment with said load axis; and then
   (b) ushering said shirred casing article down chute and onto said upwardly tilted stuffing horn.

18. A method as in claim 17 wherein said chute has an uppermost end below and laterally spaced from said discharge station to form a gap therebetween such that the locus of said chute extended intersects said discharge station, and said tilting of said casing article about said discharge station causing said shirred casing article to bridge the gap between said chute and discharge station.

19. A method as in claim 17 wherein said chute has a lowermost end spaced from the discharge end of said upwardly tilted stuffing horn a distance which is shorter than the length of said shirred casing article and said ushering step includes moving said shirred casing article across said space.

20. A method as in claim 18 wherein said casing article is composed of a shirred stick disposed on a tubular core and said tubular core remains on a stuffing horn after the stuffing of the shirred stick on said core, said method further comprising the step of:
   (a) positioning along said load axis a stuffing horn which carries a tubular core; and
   (b) unloading said tubular core from said stuffing horn prior to loading a said shirred casing article onto said horn.

21. A method as in claim 20 wherein said unloading step comprises:
   (a) driving said tubular core from said stuffing horn upwardly along said load axis and onto said chute;
   (b) continuing the driving of said tubular core upwardly along said chute; and then
   (c) tilting said tubular core over the uppermost end of said chute such that it falls into and through said gap for discarding said tubular core from said loader.

* * * * *